United States Patent Office 3,130,244
Patented Apr. 21, 1964

3,130,244
HYDROCARBON CONVERSION PROCESS AND CATALYST THEREFOR
William G. Nixon, Westchester, Ill., assignor to Universal Oil Products Company, Des Plaines, Ill., a corporation of Delaware
No Drawing. Filed Sept. 29, 1960, Ser. No. 59,175
9 Claims. (Cl. 260—683.15)

This invention relates to a process for the conversion of unsaturated organic compounds and more particularly to a process for converting olefinic hydrocarbons into more useful compounds. More specifically the invention is concerned with a process for polymerizing olefinic hydrocarbons utilizing a novel catalytic composition of matter.

The conversion of unsaturated hydrocarbons and particularly a process for polymerizing these compounds is especially useful in modern day technology. For example, gaseous olefins such as ethylene, propylene, the butylenes, etc., may be polymerized to produce polymers which are useful in many different and varied fields of chemistry, a particularly useful example being the polymerization of propylene and the butylenes to form liquid polymers useful as a fuel such as gasoline. In addition, propylene may be polymerized to form propylene tetramer or pentamer which may be used as an alkylating agent for aromatic compounds to produce intermediates useful as detergents and surface active agents. Other polymers may be used as intermediates in the preparation of long chain alcohols which are useful as solvents.

It is therefore an object of this invention to provide a process for converting unsaturated organic compounds to form useful compositions of matter.

A further object of this invention is to provide a process for converting olefinic hydrocarbons to polymers thereof in the presence of a novel catalytic composition of matter.

One embodiment of this invention resides in a process for the conversion of an unsaturated organic compound which comprises treating said compound at conversion conditions in the presence of a catalyst comprising an oxide of nitrogen selected from the group consisting of nitric acid, nitrous acid, ammonium nitrate, ammonium nitrite and metallic oxides of nitrogen, composited on a solid support.

A further embodiment of the invention resides in a process for the conversion of an olefinic hydrocarbon which comprises treating said hydrocarbon at a temperature in the range of from about 25° to about 150° C. and at a pressure in the range of from about 1 to about 100 atmospheres in the presence of a catalyst comprising an oxide of nitrogen selected from the group consisting of nitric acid, nitrous acid, ammonium nitrate, ammonium nitrite and metallic oxides of nitrogen, composited on a solid support.

A still further embodiment of the invention resides in a process for the conversion of an olefinic hydrocarbon which comprises treating said hydrocarbon at a temperature in the range of from about 25° to about 150° C. and at a pressure in the range of from about 1 to about 100 atmospheres in the presence of a catalyst comprising an oxide of nitrogen selected from the group consisting of nitric acid, nitrous acid, ammonium nitrate, ammonium nitrite and metallic oxides of nitrogen, composited on an alumina-silica support.

A specific embodiment of the invention resides in a process for the polymerization of isobutylene which comprises treating said isobutylene at a temperature in the range of from about 25° to about 150° C. and at a pressure in the range of from about 1 to about 100 atmospheres in the presence of a catalyst comprising an oxide of nitrogen selected from the group consisting of nitric acid, nitrous acid, ammonium nitrate, ammonium nitrite and metallic oxides of nitrogen, composited on a refractory oxide support.

A more specific embodiment of the invention is found in a process for the polymerization of isobutylene which comprises treating said isobutylene at a temperature in the range of from about 25° to about 150° C. and at a pressure in the range of from about 1 to about 100 atmospheres in the presence of a catalyst comprising nitric acid composited on an alumina support.

Other objects and embodiments referring to alternative unsaturated organic compounds and to alternative catalytic compositions of matter will be found in the following further detailed description of the invention.

It has now been discovered that unsaturated organic compounds and particularly olefinic hydrocarbons may be converted to other and more useful compounds by treating said olefinic hydrocarbons in the presence of a catalytic composition of matter. Examples of olefinic hydrocarbons which may be converted according to the process of this invention include monoolefins such as ethylene, propylene, 1-butene, 2-butene, 2-methyl-1-butene, 2-methyl-2-butene, 1-pentene, 2-pentene, 3-pentene, 2-methyl-1-pentene, 3-methyl-1-pentene, 2-methyl-2-pentene, 3-methyl-2-pentene, 3-methyl-3-pentene, 1-hexene, 2-hexene, 3-hexene, 2-methyl-1-hexene, 3-methyl-1-hexene, 4-methyl-1-hexene, 2-methyl-2-hexene, 3-methyl-2-hexene, 2-methyl-3-hexene, 3-methyl-3-hexene, 1-heptene, 2-heptene, 3-heptene, 2-methyl-1-heptene, 3-methyl-1-heptene, 4-methyl-1-heptene, 2-methyl-2-heptene, 3-methyl-2-heptene, etc.; polyolefins such as 1,3-butadiene, 2-methyl-1,3-butadiene, 1,3-pentadiene, 2-methyl-1,3-pentadiene, 1,4-pentadiene, 2-methyl-1,4-pentadiene, 1,3-hexadiene, 1,4-hexadiene, 2-methyl-1,3-hexadiene, etc.; and cyclic olefins such as cyclopentene, cyclohexene, cycloheptene, etc.

As hereinbefore set forth the invention is concerned with a process for the conversion of unsaturated organic compounds and particularly olefinic hydrocarbons, said process being effected in the presence of a catalyst which possesses a high degree of hydrocarbon conversion activity and is particularly effective as a polymerization catalyst for the unsaturated compounds hereinabove set forth. The catalyst comprises an oxide of nitrogen such as nitric acid, nitrous acid, ammonium oxides of nitrogen such as ammonium nitrate, ammonium nitrite or certain metallic oxides of nitrogen, composited on a solid support. In particular the catalyst composition of the present invention is particularly effective for the selective polymerization of isobutylene. However, not every solid support can be utilized as a satisfactory one for disposal of an oxide of nitrogen thereon. The particular solid support which is to be utilized should possess a relatively high surface area and be relatively or substantially free from water. In most cases this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required for the dehydration will vary depending upon the support, and in addition, will depend upon whether the water is in a combined or in merely a physically adsorbed form. As hereinbefore set forth the support is preferably, although not necessarily, characterized by having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the oxides of nitrogen in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion the limitation on the use of any particular support is one of freedom from combined or adsorbed water in combination with the high surface area of the support selected. In addition to the aforementioned gamma-, eta- and theta-aluminas which may be utilized as solid supports it is also contemplated that other refractory oxides which possess the necessary surface area characteristics and which are in a substantially anhydrous state such as silica or combinations thereof such as silica-alumina, silica-magnesia, alumina-silica-magnesia, alumina-thoria, alumina-zirconia, etc., may also be utilized as solid supports for the various oxides of nitrogen hereinafter enumerated which may be impregnated thereon or composited therewith.

Oxides of nitrogen which are composited with the solid support hereinabove set forth include metallic oxides of nitrogen in which the metallic portion of the compound preferably comprises a metal of group VI of the periodic table, a metal of the iron group of group VIII as well as aluminum, etc.; such metallic oxides including aluminum nitrate, aluminum nitrite, nickel nitrate, nickel nitrite, chromium nitrate, chromium nitrite, molybdenum nitrate, molybdenum nitrite, tungsten nitrate, tungsten nitrite, cobalt nitrate, cobalt nitrite, ferric nitrate, ferric nitrite, etc. In addition to the hereinabove enumerated metallic oxides of nitrogen it is also contemplated within the scope of this invention that a refractory oxide support of the type hereinbefore set forth may be impregnated with a solution of ammonium nitrate, ammonium nitrite or with a solution of nitric acid or nitrous acid followed by the addition of a sufficient amount of ammonium hydroxide to render the composite alkaline in nature. Following the impregnation the support is then calcined thereby driving off the ammonia and allowing the nitrate or nitrite to remain impregnated on the refractory oxide support. In addition to the aforesaid oxides of nitrogen the refractory oxide support which is substantially or completely free of combined water may also be impregnated with concentrated nitric acid or nitrous acid without any further neutralization steps, said acid being utilized in an amount sufficient so that the final catalytic composite possesses from about 1 to about 15% by weight of nitrate or nitrite content.

The addition of the oxide of nitrogen to the refractory oxide support will enhance the surface-area characteristics of the support. Surface-area characteristics are defined as the surface area, expressed as square meters per gram; pore volume, expressed as cubic centimeters per gram; and pore diameter expressed in Angstrom units (A.). It has been found that refractory inorganic oxides possessing greater surface area, coupled with a smaller pore diameter, results in improved adsorptive capacity, especially when serving as a treating agent. As hereinbefore set forth certain forms of alumina which possess the desired surface area characteristics may be utilized as the refractory oxide supports for the catalyst of this invention. The base alumina may be prepared by any of the well known suitable means of manufacture, one example of which is the addition of an alkaline reagent to a salt of aluminum in an amount sufficient to form aluminum hydroxide which, upon drying and calcining, is converted to alumina. Likewise, if silica is to be utilized as the refractory oxide support it may be prepared by the acidification of water glass. Similarly if the refractory oxide support comprises both alumina and silica these components may be prepared by separate, successive or coprecipitate means.

The catalyst which is utilized in the process of the present invention may be prepared by any method known in the art. For example a refractory oxide base previously prepared by the methods hereinbefore set forth is then combined with an oxide of nitrogen by conventional means such as treating the base with a solution of said oxide of nitrogen, said oxide of nitrogen being added in an amount sufficient to allow the finished catalyst to contain from about 0.5 to about 15% or more by weight of nitrate or nitrite. Following this the combined material is then dried by air oxidation in a furnace tube or muffle furnace, etc. The finished catalyst comprising the oxide of nitrogen composited on the refractory oxide support is then utilized as a conversion catalyst, and especially a polymerization catalyst in the usual manner.

The process of this invention utilizing the catalyst hereinbefore set forth may be effected in any suitable manner and may comprise either a batch or a continuous type operation. For example the catalyst is active for promoting the polymerization of olefinic hydrocarbons, particularly for polymerizing normal gaseous olefinic hydrocarbons to form normally liquid hydrocarbons suitable for use as constituents for gasoline. When employed in the conversion of olefinic hydrocarbons into polymers the catalyst formed as hereinbefore set forth is preferably employed as a granular layer in a heated reactor which is generally made from steel, and through which the preheated hydrocarbon fraction is dried. Thus, the solid catalyst of this invention may be employed for treating mixtures of olefin-containing hydrocarbon vapors to effect olefin polymerization, but the same catalyst may also be used at operating conditions suitable for maintaining liquid phase operating during polymerization of olefinic hydrocarbons such as butylenes, to produce gasoline fractions. When employed in the polymerization of normally gaseous olefins, the formed and calcined catalyst particles are generally placed in a vertical, cylindrical treating tower and the olefin-containing gas mixture is passed downwardly thereto at a temperature of from about room temperature (25° C) to about 150° C. and at a pressure of from about 1 to about 100 atmospheres. These conditions are particularly applicable when dealing with olefin-containing material such as stabilizer reflux which may contain from approximately 10 to 50% or more of propylene and butylenes. When operating in a mixture comprising essentially butanes and butylenes, this catalyst is effective at conditions favoring the maximum utilization of isobutylene at a temperature of from about 100° to about 150° C.

It is also contemplated within the scope of this invention that the catalyst of the type hereinbefore set forth may be utilized for promoting miscellaneous organic reactions, the catalyst being employed in essentially the same way as they are used when polymerizing olefins in that the reactions are essentially in suspension in liquid phase in various types of equipment. Typical cases of reactions in which the present type of catalyst may be used include the alkylation of cyclic compounds with olefins, the cyclic compounds including aromatics, polycyclic compounds, naphthenes and phenols; condensation reactions such as those occurring between ethers and aromatics, etc.; reactions involving the hydrohalogenation of unsaturated organic compounds, isomerization reactions; ester formation by the interaction of carboxylic acids and olefins; and the like. The specific procedures for utilizing the present type of catalyst in miscellaneous organic reactions will be determined by the chemical and physical characteristics and the phase of the reacting constituents.

As hereinbefore set forth the catalyst of the present invention may be effectively used in a continuous type operation. For example a particularly effective type of continuous operation in which this catalyst may be used comprises a fixed bed operation. The catalyst is positioned as a fixed bed in a reaction zone which may comprise an unpacked vessel or coil or which may be lined with an adsorbent packing material such as dehydrated bauxite, fire brick, alumina and the like. The olefinic hydrocarbon to be converted is continuously charged to the reaction zone which is maintained at the proper operating conditions of temperature and pressure, i.e., a temperature of from about 25° to about 150° C. and at a pressure ranging from about 1 to about 100 atmospheres or more, at a liquid hourly space velocity (the volume of charge per volume of catalyst per hour) in a range of from about 0.1 to about 20 or more, and preferably in a range of from about 0.1 to about 10, or at a gaseous hourly space velocity in a range of from about 100 to about 1500 or more. This charge passes through the catalyst bed in either an upward or downward flow and the polymerized product is continuously withdrawn, separated from the reactor effluent and recovered while the unreacted starting materials may be recycled to form a portion of the feed stock. It is also contemplated within the scope of this invention that reaction gases such as hydrogen, nitrogen, oxygen, air, etc., may also be charged to the reaction zone if necessary.

The following examples are given to illustrate the process of the present invention which, however, are not intended to limit the generally broad scope of the present invention in strict accordance therewith.

EXAMPLE I

A catalyst of the type hereinbefore set forth was prepared by admixing a refractory oxide support comprising sprayed dried silica gel which had been dried at about 400° F. with a 15% solution of aluminum nitrate. The admixture was pilled, then placed in a furnace tube and slowly heated in an air oxidation medium to a temperature of 300° C. using 800 cc. of air per minute, the pilled material being maintained at this temperature for a period of about three hours.

A 30 cc. portion of the aluminum nitrate-silica catalyst was placed in an appropriate apparatus provided with heating means. Isobutylene was charged to the reactor for two hours using a GHSV of 370, the reactor being maintained at a temperature of 125° C. A condenser cooled by ice was used to collect the liquid product resulting from the polymerization reaction. In this instance 31 cc. (21.7 g.) of liquid polymer product was collected in the ice condenser. The liquid product was then analyzed using a mass spectrometer, the results of said analysis being set forth in Table I below.

*Table I*

| Carbon # | Weight Percent $C_nH_{2n}$ | Weight Percent $C_nH_{2n-2}$ |
| --- | --- | --- |
| $C_6$ | 1.27 | |
| $C_7$ | 0.97 | |
| $C_8$ | 54.95 | |
| $C_9$ | 0.69 | 0.59 |
| $C_{10}$ | 0.74 | 0.26 |
| $C_{11}$ | 0.50 | |
| $C_{12}$ | 35.23 | 0.19 |
| $C_{13}$ | | |
| $C_{14}$ | | |
| $C_{15}$ | | |
| $C_{16}$ | 4.59 | |
| Totals | 98.95 | 1.05 |

EXAMPLE II

Another catalyst is prepared by impregnating 50 g. of alumina spheres with about 85 cc. of a solution containing 5 cc. of concentrated nitric acid. The resulting composite is then adjusted to a pH of about 9.0 using ammonium hydroxide. Following this, the composite is then placed in a furnace tube which is slowly heated to a temperature of about 300° C. and maintained thereat at this temperature for a period of about two hours while air oxidizing the composite using approximately 800 cc. of air per minute. During the heating of the composite to the desired temperature it will be noted that ammonia gas is evolved from the catalyst thereby leaving an oxide of nitrogen on the refractory oxide base.

EXAMPLE III

Yet another catalyst is prepared by impregnating alumina spheres with a solution containing concentrated nitric acid after which the composite is dried to remove excess water. Following this the composite is placed in a furnace tube and air oxidized to a catalyst temperature of 300° C. using 800 cc. of air per minute.

EXAMPLE IV

A catalyst similar to those set forth in the above examples is prepared by compositing a cobalt nitrate solution containing approximately 15% cobalt nitrate with a refractory oxide base comprising alumina spheres. The resulting composite is then placed in a muffle furnace or furnace tube and is slowly heated to a temperature of about 300° C. Upon reaching this temperature the catalyst is air oxidized using approximately 800 cc. of air per minute for an additional period of about one hour.

EXAMPLE V

A catalyst similar to that described in Example I is prepared by admixing a 20% molybdenum nitrate solution with a refractory oxide base comprising alumina-silica spheres. Following this admixture a composite is treated in a manner similar to that set forth above, that is, by placing the composite in a furnace tube, heating the composite to a temperature of about 300° C. and air oxidizing the composite for a period of about one hour.

The catalyst prepared according to Examples II to V when utilized as polymerization catalysts will exhibit an activity similar to that shown in Example I above.

I claim as my invention:

1. A hydrocarbon conversion process which comprises polymerizing an olefin in the presence of a catalyst comprising a refractory oxide support selected from the group consisting of substantially anhydrous silica and alumina having a surface area in excess of 25 square meters per gram and from about 0.5% to about 15% by weight of a metallic oxide of nitrogen in which the metal is selected from the group consisting of aluminum and metals of group VI and the iron group of group VIII of the periodic table.

2. A hydrocarbon conversion process which comprises polymerizing an olefin in the presence of a catalyst comprising a substantially anhydrous alumina support having a surface area in excess of 25 square meters per gram and from about 0.5% to about 15% by weight of a metallic oxide of nitrogen in which the metal is selected from the group consisting of aluminum and metals of group VI and the iron group of group VIII of the periodic table.

3. A hydrocarbon conversion process which comprises polymerizing an olefin in the presence of a catalyst comprising a substantially anhydrous silica support having a surface area in excess of 25 square meters per gram and from about 0.5% to about 15% by weight of a metallic oxide of nitrogen in which the metal is selected from the group consisting of aluminum and metals of group VI and the iron group of group VIII of the periodic table.

4. A hydrocarbon conversion process which comprises polymerizing an olefin in the presence of a catalyst comprising a substantially anhydrous silica-alumina support having a surface area in excess of 25 square meters per gram and from about 0.5% to about 15% by weight of a metallic oxide of nitrogen in which the metal is selected from the group consisting of aluminum and metals of group VI and the iron group of group VIII of the periodic table.

5. The process of claim 3 further characterized in that said metallic oxide of nitrogen is aluminum nitrate.

6. The process of claim 2 further characterized in that said metallic oxide of nitrogen is cobalt nitrate.

7. The process of claim 4 further characterized in that said metallic oxide of nitrogen is molybdenum nitrate.

8. The process of claim 1 further characterized in that said olefin is isobutylene.

9. The process of claim 5 further characterized in that said olefin is isobutylene.

References Cited in the file of this patent

UNITED STATES PATENTS

| | | |
|---|---|---|
| 2,042,050 | Hoover | May 26, 1936 |
| 2,122,787 | Tropsch | July 5, 1938 |
| 2,387,794 | Hull | Oct. 30, 1945 |
| 2,519,199 | Salisbury | Aug. 15, 1950 |
| 2,692,295 | Peters | Oct. 19, 1954 |
| 2,802,814 | Feller et al. | Aug. 13, 1957 |
| 2,927,903 | Nixon | Mar. 8, 1960 |
| 2,949,429 | Bailey et al. | Aug. 16, 1960 |
| 2,982,793 | Turner et al. | May 2, 1961 |